US007236886B2

(12) United States Patent
Frenkel

(10) Patent No.: US 7,236,886 B2
(45) Date of Patent: Jun. 26, 2007

(54) MULTISCALE MULTIDIMENSIONAL WELL LOG DATA INVERSION AND DEEP FORMATION IMAGING METHOD

(75) Inventor: Michael A. Frenkel, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 11/266,537

(22) Filed: Nov. 3, 2005

(65) Prior Publication Data
US 2006/0095239 A1 May 4, 2006

Related U.S. Application Data

(60) Provisional application No. 60/625,267, filed on Nov. 4, 2004.

(51) Int. Cl.
*G01V 9/00* (2006.01)
(52) U.S. Cl. ............................ 702/6; 702/11; 703/10
(58) Field of Classification Search ................ 702/7, 702/6, 11; 703/10; 324/338, 339, 343
See application file for complete search history.

(56) References Cited

U.S. PATENT DOCUMENTS

| | | | |
|---|---|---|---|
| 4,837,517 A | 6/1989 | Barber ........................ 324/339 |
| 5,157,605 A | 10/1992 | Chandler et al. ........... 364/422 |
| 5,452,761 A | 9/1995 | Beard et al. ................. 166/250 |
| 5,854,991 A * | 12/1998 | Gupta et al. ................... 702/7 |
| 5,867,806 A * | 2/1999 | Strickland et al. .............. 702/7 |
| 5,889,729 A | 3/1999 | Frenkel et al. ................ 367/73 |
| 6,060,885 A | 5/2000 | Tabarovsky et al. ........ 324/366 |
| 6,502,036 B2 * | 12/2002 | Zhang et al. ................... 702/7 |
| 6,944,546 B2 * | 9/2005 | Xiao et al. ..................... 702/6 |
| 2002/0017905 A1 | 2/2002 | Conti ........................... 324/339 |
| 2003/0038634 A1 | 2/2003 | Strack ......................... 324/323 |
| 2003/0057950 A1 | 3/2003 | Gao et al. ................... 324/339 |
| 2004/0117120 A1 | 6/2004 | Frenkel et al. ................. 702/7 |
| 2004/0140811 A1 | 7/2004 | Conti ........................... 324/338 |
| 2004/0145370 A1 | 7/2004 | Conti ........................... 324/339 |
| 2004/0196046 A1 | 10/2004 | Aidan et al. ................. 324/339 |
| 2004/0207403 A1 | 10/2004 | Fanini et al. ................ 324/339 |
| 2005/0156602 A1 | 7/2005 | Conti ........................... 324/339 |
| 2006/0023569 A1 | 2/2006 | Agullo et al. ................. 367/73 |
| 2006/0235619 A1 | 10/2006 | Yang et al. ................... 702/10 |

OTHER PUBLICATIONS

J.W. Smits et al.; *Improved Resistivity Interpretation Utilizing a New Array Laterolog Tool and Associated Inversion Processing*, SPE 49328, 1998 SPE Annual Tec.hnical Conference and Exhibition, New Orleans, Louisiana, Sep. 27-30, 1998, pp. 831-844, 14 Figs.

* cited by examiner

*Primary Examiner*—D. McElheny, Jr.
(74) *Attorney, Agent, or Firm*—Madan, Mossman & Sriram, P.C.

(57) ABSTRACT

Different subsets of multiarray resistivity measurements are inverted using a corresponding resistivity model. The models are selected based at least in part on the resolution of the measurements. Results of the inversion are combined to give a single model consistent with the resolution and depth of penetration of each subset of the multiarray data.

31 Claims, 15 Drawing Sheets

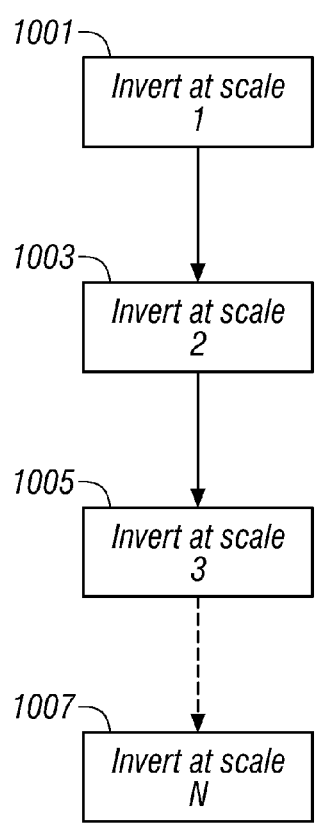
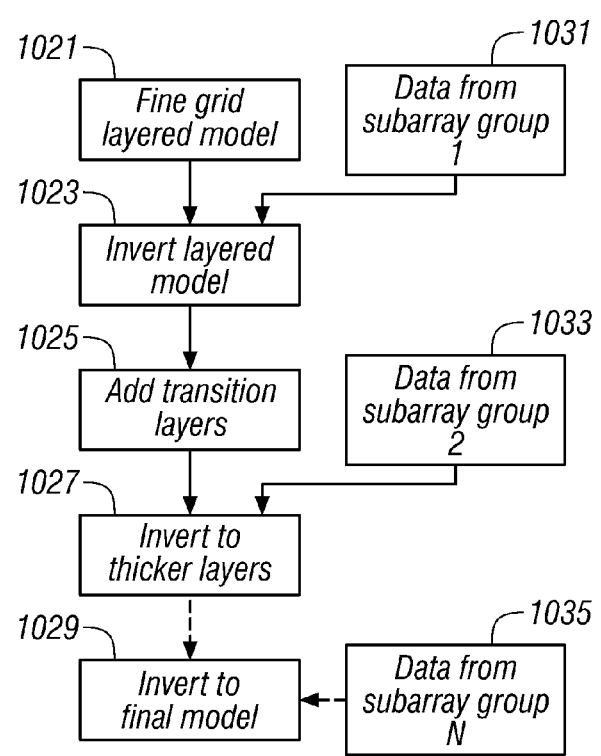
FIG. 11
FIG. 12

MULTISCALE MULTIDIMENSIONAL WELL LOG DATA INVERSION AND DEEP FORMATION IMAGING METHOD

CROSS-REFERENCES TO RELATED APPLICATIONS

This application claims priority from U.S. Provisional Patent Application Ser. No. 60/625,267 filed on Nov. 4, 2004.

BACKGROUND OF THE INVENTION

1. Field of the Invention

The invention is related generally to the field of interpretation of measurements made by well logging instruments for the purpose of determining the properties of earth formations. More specifically, the invention is related to a method for determination of formation resistivity using multi-array resistivity data.

2. Background of the Art

Electromagnetic induction, wave propagation, and galvanic logging tools are commonly used for determination of electrical properties of formations surrounding a borehole. These logging tools give measurements of apparent resistivity (or conductivity) of the formation that when properly interpreted are diagnostic of the petrophysical properties of the formation and the fluids therein.

The physical principles of electromagnetic induction resistivity well logging are described, for example, in, H. G. Doll, Introduction to Induction Logging and Application to Logging of Wells Drilled with Oil Based Mud, Journal of Petroleum Technology, vol. 1, p. 148, Society of Petroleum Engineers, Richardson Tex. (1949). Many improvements and modifications to electromagnetic induction resistivity instruments have been devised since publication of the Doll reference, supra. Examples of such modifications and improvements can be found, for example, in U.S. Pat. No. 4,837,517; U.S. Pat. No. 5,157,605 issued to Chandler et al, and U.S. Pat. No. 5,452,761 issued to Beard et al. Other tools include the HDLL (High Definition Lateral Log) of Baker Hughes Incorporated, described in U.S. Pat. No. 6,060,885 to Tabarovsky et al., and any generic Array Laterolog tools, e.g., the High Resolution Laterolog Array tool (HRLA) of Schlumberger Inc.

Analysis of measurements made by an array induction logging tool such as that disclosed by Beard and galvanic logging tools such as the HDLL and HRLA or any generic Array Laterolog tools are based on inversion. Prior art log inversion methods commonly use a single formation model for the entire interpretation process. This single model approach has limitations when executing either joint or sequential inversions.

One problem with inversion is that the earth is characterized by, at the very least, a 2-D model (layers with radial changes in resistivity within each layer). A rigorous 2-D inversion technique would be quite time consuming and impractical for wellsite implementation. See, for example, Mezzatesta et al., and Barber et al. Several methods have been used in the past for speeding up the inversion. One method is based on a sequential determination of the formation parameters. See, for example, Frenkel et al. (2004). Another method is to get a better initial model determination. This is discussed with reference to high definition lateral logs by Hakvoort et al. or Frenkel and Walker (2001). Yet other methods divide the multidimensional (2-D or 3-D) inversion process into a sequence of simple one-dimensional processes. See for example, U.S. Pat. No. 5,889,729 issued to Frenkel et al., Frenkel et al. (1996), and Frenkel (2002) disclose a rapid inversion method that performs a sequence of 1-D iterations that converge to the true 2-D or 3-D isotropic or anisotropic solution.

The so called 1-D+1-D method of Griffiths et al. is based on sequential vertical 1-D (shoulder-bed correction) and horizontal (radial) 1-D inversions. The main shortcoming of this method, as indicated by the authors, is it may provide incorrect results for the thin invaded formations. Therefore, to complete the interpretation, an additional, time consuming rigorous 2-D inversion step is required.

It should be noted that the referenced inversion-based array log data interpretation methods use a single formation model. By not accounting for the vertical resolution differences of the input subarray data, both joint or sequential inversion procedures may lead to unstable and incorrect results in thin invaded formations. A so-called multiscale inversion approach has been used for seismic data interpretation (see, for example, Bunks et al., and Zhou), but has not been applied to join inversion of well logs with different resolution.

There is a need for a 2-D and 3-D robust methods of interpretation that addresses the instability problems associated with thin bed inversion, accounts for different resolution of different log measurements, and is still computationally fast. The present invention addresses this need.

SUMMARY OF THE INVENTION

One embodiment of the invention is a method of determining a property of an earth formation. A plurality of subsets of array data indicative of the property are obtained using a logging tool conveyed in a borehole in the earth formation, each of the subsets of array data having an associated resolution. A first subset of the array data is processed to give a first model of the earth formation. Using the first model and processing another of the subsets of array data, a 2-D layered model, a 3-D layered model and/or a 2-D image of the borehole is obtained. The property may be a resistivity of the earth formation. The array data may be acquired using a multiarray induction logging tool, a multicomponent induction logging tool and/or a galvanic locking tool. One of the subsets may have a different horizontal and/or vertical resolution of another of the subsets.

Another embodiment of the invention is an apparatus for determining a property of an earth formation. The apparatus includes a logging tool conveyed into a borehole in the earth formation, the logging tool obtaining two or more subsets of array data indicative of the property, each of the subsets having an associated resolution. The apparatus also includes a processor which processes a first subset of the array data to give a first model, and using the first model and by processing another subset of the array data, obtains a 2-D layered model of the formation, a 3-D model of the formation, and/or a 2-D image of the formation. The property may be a resistivity of the earth formation. The logging tool may be a multiarray induction logging tool, a multicomponent induction logging tool or a galvanic logging tool. One of the subsets may have a different vertical and/or horizontal resolution than another of the subset. The logging tool may be conveyed into the borehole on a wireline, a drilling tubular or a slickline.

Another embodiment of the invention is a computer readable medium for use with an apparatus for determining a property of an earth formation. The apparatus includes a logging tool conveyed in a borehole in the earth formation that obtains a plurality of subsets of array data indicative of the property, each of the subsets having an associated resolution. The medium includes instructions which enable a processor to process a first subset of the array data to give a first model, and using the first model and processing of another subset of the array data, obtain a 2-D layered model of the earth formation, a 3-D layered model of the earth formation, and/or a 2-D image of the borehole. The medium may be one of a ROM, an EPROM, an EAROM, a Flash Memory, and an optical disk

BRIEF DESCRIPTION OF THE FIGURES

The present invention is best understood with reference to the accompanying figures in which like numerals refer to like elements and in which:

FIG. 11 shows a flow chart of an embodiment of the invention in which inversion is successively carried out using array data at different scales, starting from large scale data; and FIG. 12 shows a flow chart of an embodiment of the invention in which inversion is successively carried out using array data at different scales, starting from small scale data.

DETAILED DESCRIPTION OF THE INVENTION

Figure 1:
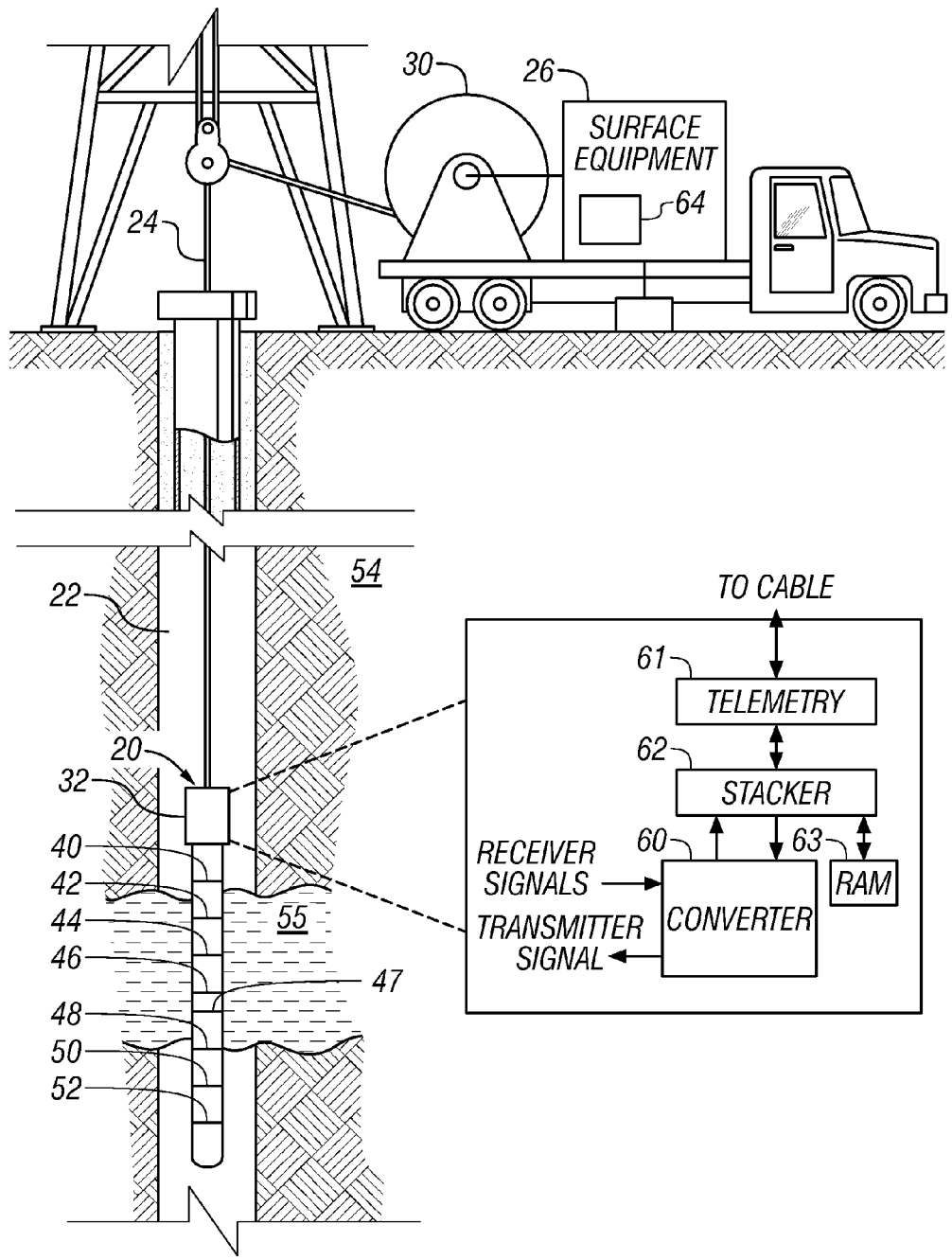
FIG. 1 shows an induction instrument disposed in a wellbore penetrating an earth formation.

Referring now to FIG. 1, an exemplary induction logging tool 20 suitable for use with the method of the present invention is shown positioned in a borehole 22 penetrating earth formations 54. The tool 20, which is suspended in the borehole 22 by means of a wireline cable 24, includes a borehole sonde 34 and an electronic circuitry section 32. The tool 20 is lowered into the borehole 22 by a cable 24, which preferably passes over a sheave 30 located at the surface of the borehole 22. The cable 24 is typically spooled onto a drum (not shown). The cable 24 includes insulated electric conductors for transmitting electrical signals. The electronic circuitry section 32 of the tool 20 receives signals from the sonde section 34 and typically comprises a processor. Some or all of the processing may also be done by a surface processor, or by a remote processor linked to the wellsite by a suitable satellite link.

The sonde 34 preferably includes a plurality of coils 40–52. Coil 46 is a transmitter coil for transmitting an oscillating signal into the adjacent surrounding geological formation 54. Preferably, a square wave signal is supplied to the coil 46. However, it is contemplated that any of a number of oscillating voltage signals having multiple frequency components can be used. Further, it is desirable that, on occasion, a single-frequency signal, such as a sinusoidal signal, is used. The oscillating voltage signal applied to the coil 46 generates a current in coil 46 which in turn generates an electromagnetic field in the surrounding formation 54. The electromagnetic field, in turn, induces eddy currents which flow coaxially with respect to the borehole 22. The magnitudes of the eddy currents are proportional to the conductivity of the surrounding formation 54. The remaining coils 40, 42, 44, 47, 48, 50 and 52 are receiver coils in which signals are induced by the electric fields caused by the eddy currents produced in the formation. As the tool 20 is raised in the borehole 22, the conductivity of the surrounding formation 54 can be determined from the received signals in order that a bed or layer 55 having a conductivity indicative of the possibility of containing hydrocarbons may be located. The configuration shown is called a High Definition Induction Logger (HDIL) and is for exemplary purposes only. Other coil configurations exist, specifically those in which transmitter and receiver coils are transverse to the tool axis. Such a configuration is used by Baker Hughes under the service mark 3 DEX, and the method of the present invention is also applicable with 3 DEX type measurements.

The electronic circuitry section 32 typically includes a converter circuit 60, a stacker circuit 62, a random access memory (RAM) 63, and a telemetry circuit 61. The converter circuit 60 comprises a plurality of pre-amplifiers, filters, and analog-to-digital (A/D) converters for receiving signals from the receiver coils 40–52 and transforming them into digitized signals for further processing by the stacker circuit 62. The analog voltage signals provided by the receiver coils 40–52 are digitally sampled according to a predetermined sampling rate in the period defined by the fundamental frequency of the transmitter signal, which in this embodiment is approximately 10 kHz.

The sampling is repeated over a large number of transmitter voltage signal cycles, preferably at least 1,024 cycles to improve the signal-to-noise ratio of the received signals. To reduce the amount of data that must be stored or transmitted, corresponding digital samples taken in each of the transmitter cycles are summed. The summed digital signal samples corresponding to each of the plurality of receiver coils form corresponding stacked signal samples, which are stored in the RAM 63. The stacked signals corresponding to the plurality of receiver coils 40–52 can then be retrieved from the RAM 63 and can be transmitted by the telemetry circuit 61 through the cable 24 to a computer (processor) 64 which forms part of the surface equipment 26, where analyses of the stacked signals can be performed.

In an alternative embodiment, a microprocessor having sufficient digital signal processing capabilities could form part of the electronic circuitry section 32. Thus, it is contemplated that the data analysis could be performed downhole, which would further reduce the amount of data to be transmitted to the surface. It is to be noted that the description of the induction logging tool above is for exemplary purposes only, and the method of the present invention can also be used with galvanic tools of the type discussed in the "Background of the Invention."

The present invention may be viewed as being based on two concepts that can be separately executed in a stand-alone mode. Alternatively, the invention may employ all or part of both of the concepts. For this reason, we discuss the two concepts separately and then show, by example, use of both concepts in the interpretation of multiarray induction resistivity data. It should be noted that the method of the present application is not limited to induction resistivity data.

The first concept is an inversion methodology that is robust in the presence of inaccurate bed boundary determinations. Identification of bed boundaries is a fundamental part of any inversion process since models used in inversion typically have constant formation properties within a zone associated with bed boundaries. Such a model with piecewise constant resistivities has much fewer parameters than a model in which resistivities could vary in an unconstrained manner from one depth to the next. This is also true of models with piecewise smooth resistivities. The model with the larger number of model parameters is more likely to have instabilities and non-uniqueness in the inversion results than a model with fewer model parameters. The potential problems with the approach are illustrated by example.

A prior art method that has been used to find the depths of potential boundaries uses the rate of change with depth of a set of logging curves. Boundaries are placed where the rate of change of the input curve (or a joint rate of change when several curves are input) is the highest. Typically, the sensitivity of the procedure can be adjusted by specifying a threshold of the rate of change, a number of layer boundaries to be found within a zone, or the window length. In practice, it is difficult to accurately pick formation boundaries using raw logs. Thus, methods based on rate of change can at best provide approximate (initial) estimates of bed boundaries. Rigorous inversion methods can, in principle be used to optimize layer boundary positions. Due to an increased number of unknown model parameters, more computer resources are need. Moreover, simultaneous determination of formation properties and layer boundaries may lead to an equivalent solution.

Figure 2:
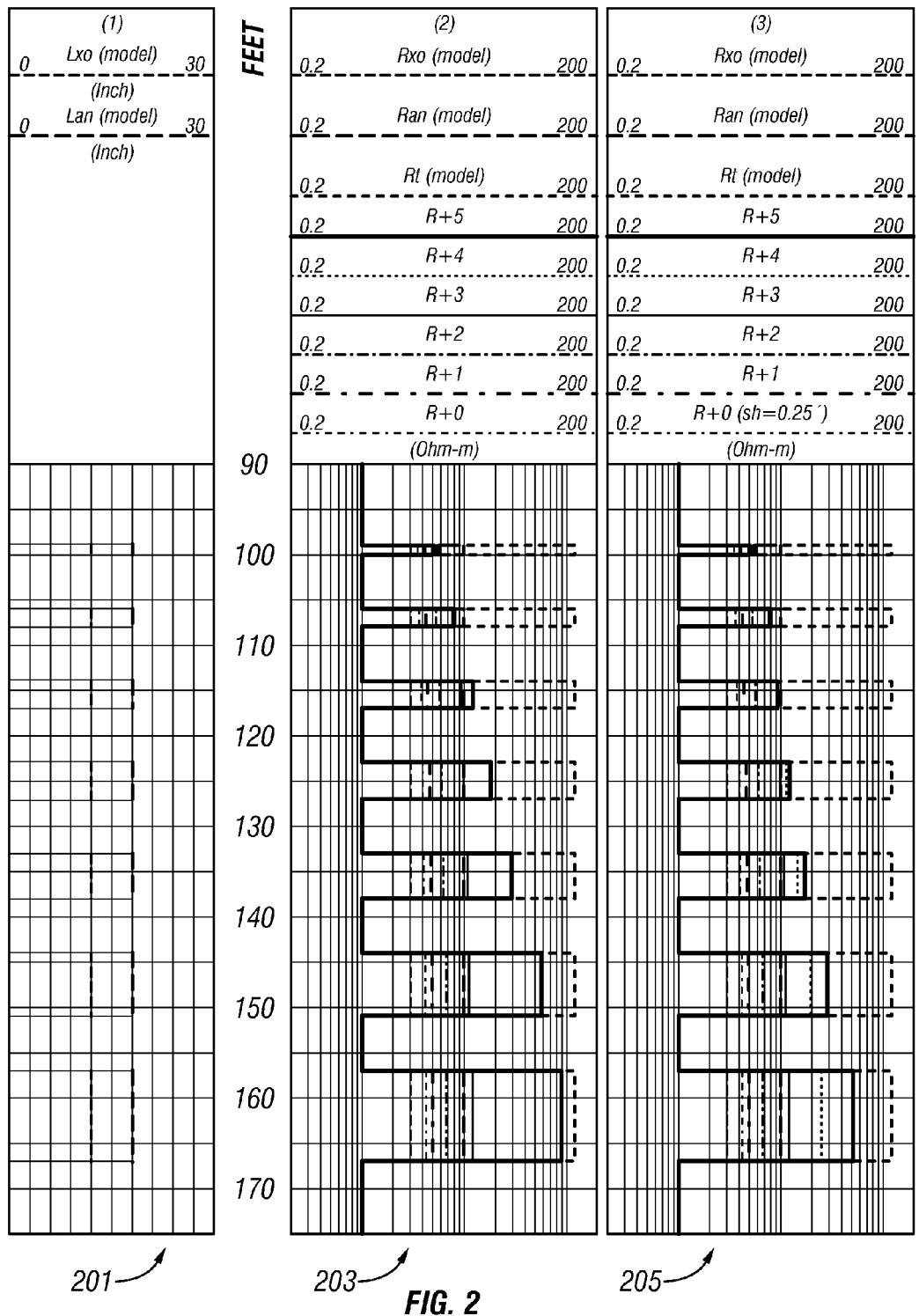
FIG. 2 shows inversion results and illustrates the effect of incorrect boundary positions in the model.

Tracks 1 and 2 (201 and 203) of FIG. 2 show the synthetic benchmark model.

The radial invasion profile is an annulus type. The shoulder, invasion, annulus, and formation resistivities are 1, 3, 10, and 120 Ω·m, respectively; Lxo=12 in., and Lan=6 in. The resistivity values are shown in track 2 by the dashed lines and the lengths of the zones are shown in track 1.

Track 2 203 shows inversion results (solid lines) with the assumption that the layer boundary positions are known. A vertical 1-D inversion of individual HDIL subarray logs using a non-invaded formation model is shown. Due to the shoulder and invasion effects, the inversion results for the HDIL subarrays, logs Rt0–Rt5, are quite different in thin and thick layers (track 2). If we would use these results as input to the joint radial 1-D inversion, the output would not provide the true formation model in all layers, except in the 10-ft one. In addition, the results would be quite different in the thin (up to 3 ft) and thick (>3 ft) layers.

track 3 205 shows results of the 1-D inversion if the bottom boundary position of each invaded layer is shifted by only one sample (0.25 ft) down from their accurate positions. The sequence of inversion results may become incorrect in the thin layers and the inversion results, in general, display quite a change from the previous ones (compare track 2 203 vs. track 3 205).

Figure 3:
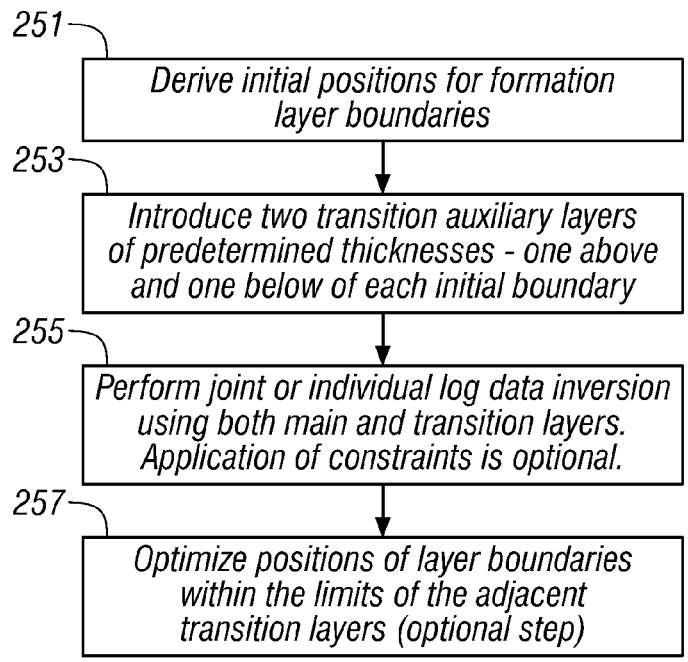
FIG. 3 is a flow chart illustrating one embodiment of the invention using auxiliary transition layers.

To remove the oscillations and sudden jumps in the vicinity of inaccurately placed boundaries, Smits has proposed using smoothness constraints in the context of inverting Array Laterolog data. Application of smoothness constraints in joint inversion may not reduce the required computer resources. It may also force the inversion to find an equivalent (incorrect) solution due to different vertical resolution of the logs involved in the interpretation process. One embodiment of the present invention is an improved method of defining the layer boundaries. This is depicted in the flow chart of FIG. 3.

Using prior art methods, such as those based on rate of change of depth of a logging curve, an initial estimate of bed boundaries is made 251. This may give, for example, a total of N layers. Transition layers are introduced above and below 253 each of the initially estimated bed boundaries. This gives a total of 2N−2 additional layers. The thickness of the transition layers is a parameter of the method and can be estimated based on the accuracy of layer picking results. A typical value of the thickness of the transition layers is 0.25 ft (7.62 cm). With this model of 3N−2 layers, a separate or joint inversion of all of the multi-array data is carried out 255. The inversion may be a constrained inversion in which resistivity values of the transition zone is constrained to lie between the resistivity values of the adjacent layers. Such a constraint is illustrated in FIG. 4.

Figure 4:
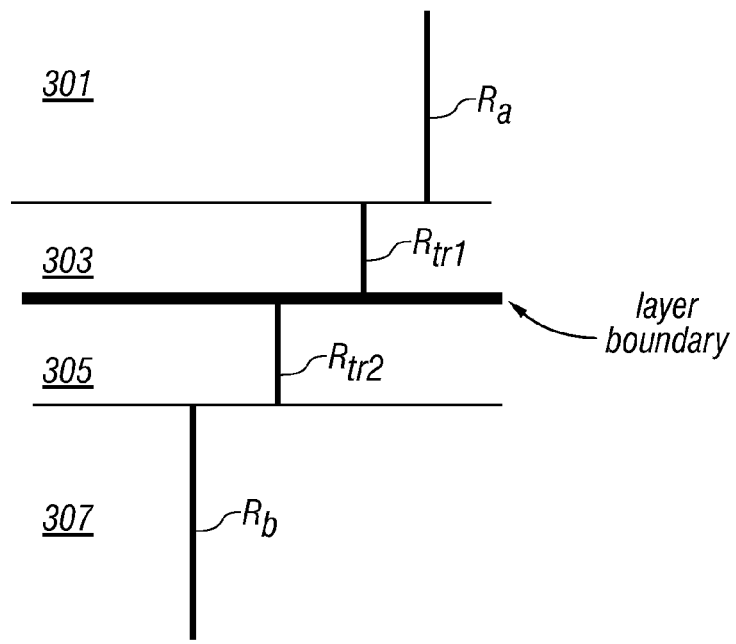
FIG. 4 is an example showing transition auxiliary layers used in the embodiment of FIG. 3.
Figure 5A:
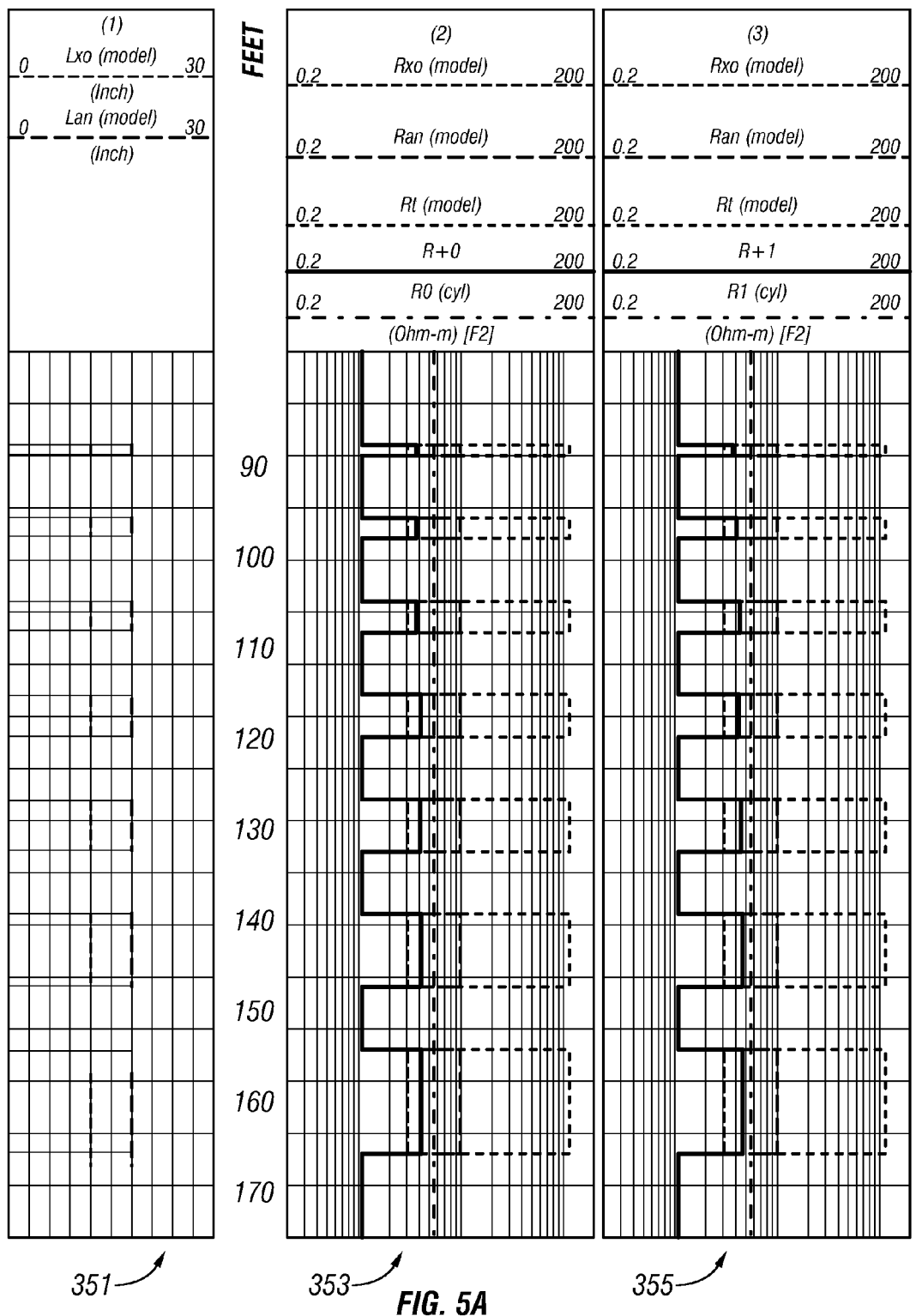
FIGS. 5a, 5b, 5c show results of 1-D vertical inversion of synthetic data using accurate boundary positions vs 1-D radial inversion for individual subarrays #0–#5.
Figure 5B:
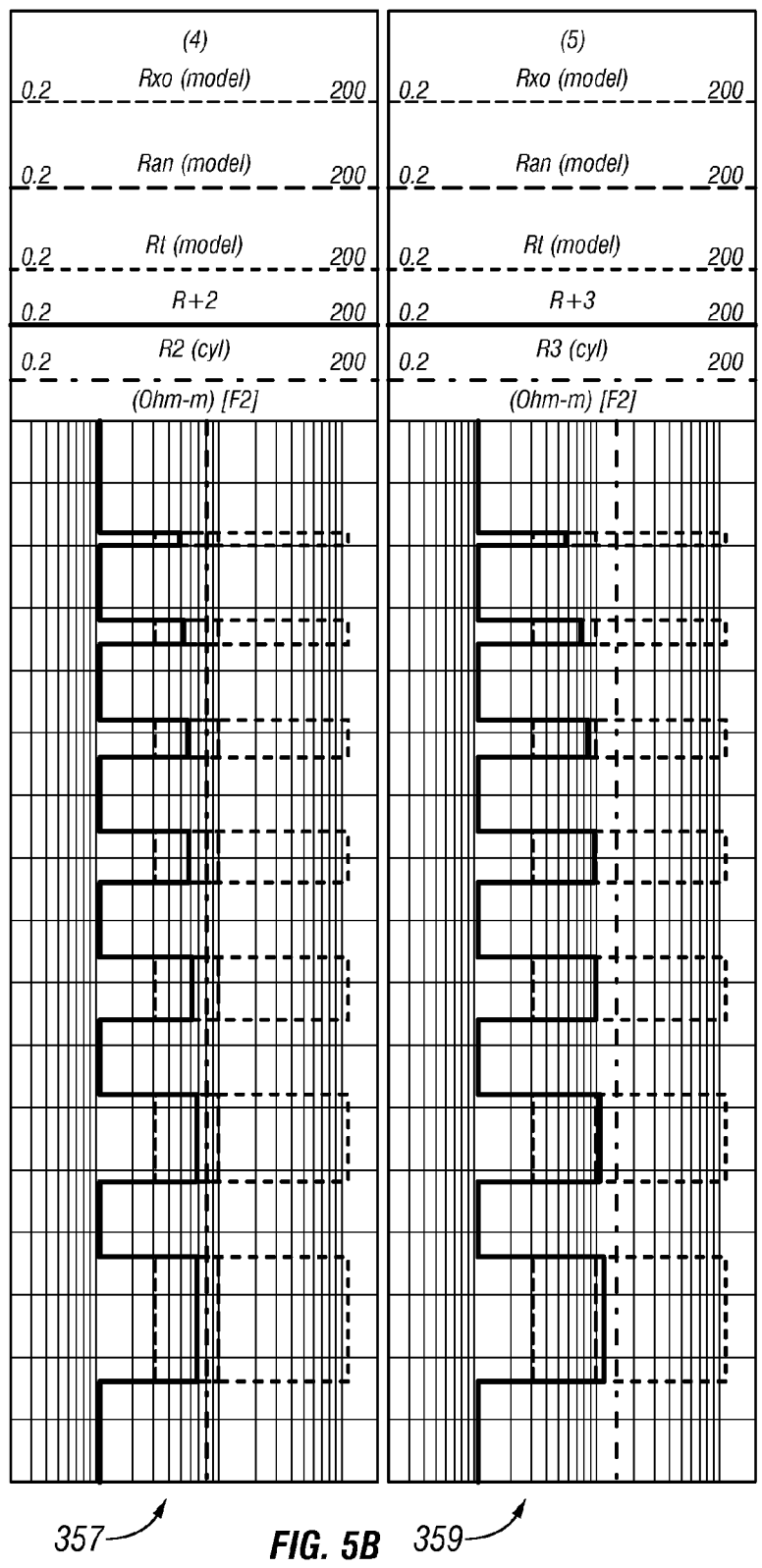
Figure 5C:
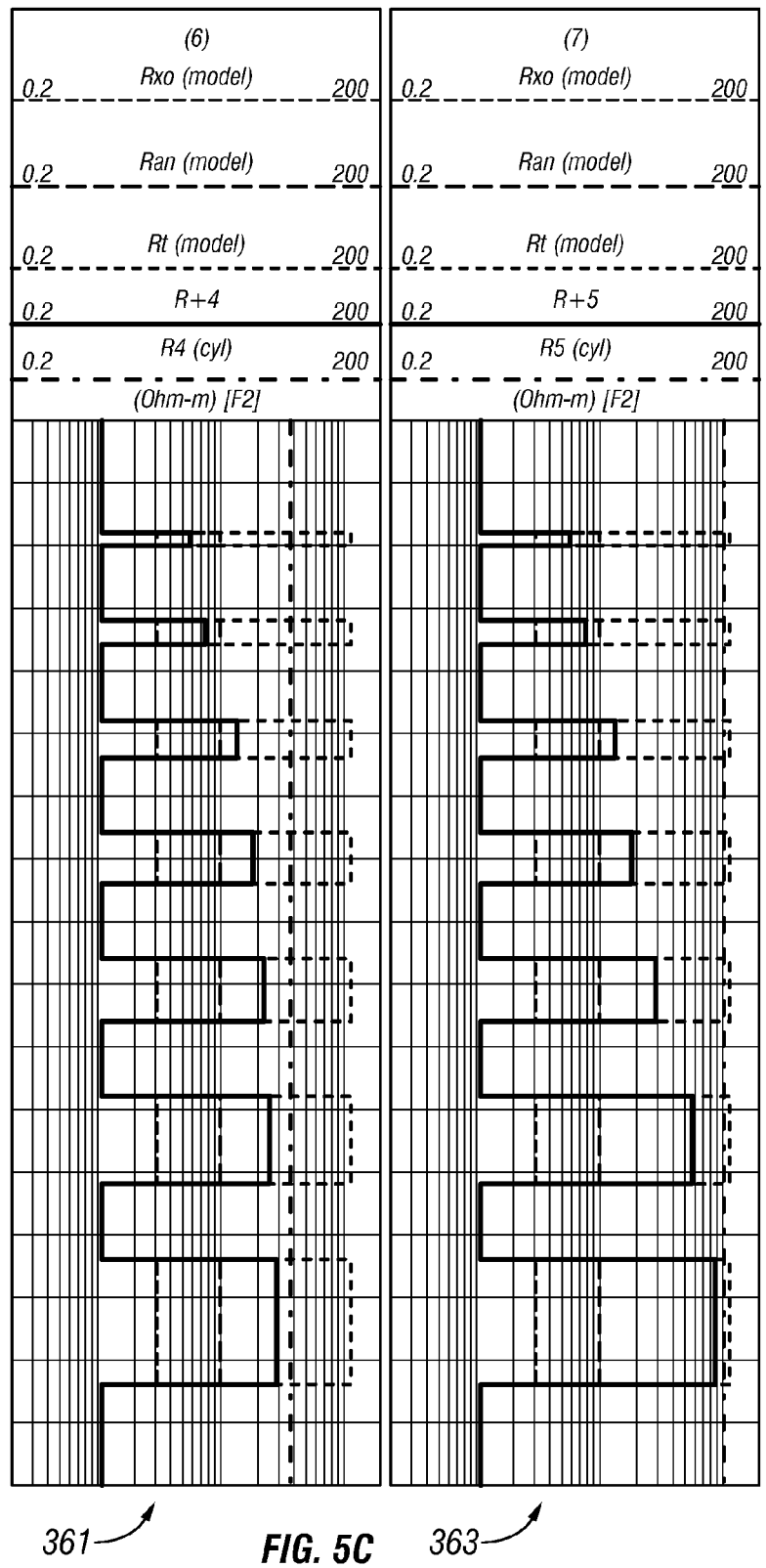

Shown in FIG. 4 are two transition layers 303, 305 introduced at a boundary between layers 301, 305. The resistivities of 301 and 305 are denoted by $R_a$ and $R_b$ respectively. A constrained inversion requires that the resistivities $R_{tr1}$ and $R_{tr2}$ lie between the $R_a$ and $R_b$ or satisfy either of the constraints, $R_a > R_{tr1}$, $R_{tr2} > R_b$ or $R_a < R_{tr1}$, $R_{tr2} < R_b$ Shown in FIGS. 5a-5c are seven tracks. 351 shows the invasion model. The dashed lines in tracks 353–363 are the resistivities for the model. The tracks 353–363 also show inversion results for the individual subarrays #0–5. Results for two different inversion methods are shown: one corresponds to a 2-D inversion whereas the other corresponds to a 1-D cylindrical model. In fact, the closer the 1-D inversion results are to the cylindrical modeling data, the less environmental effects in the inverted data are present. If the inverted $R_t$ level remains at the same level within a set of layers, it indicates the formations where this subarray inversion results can be used in the following radial inversion step.

For example, in this model example, subarrays #2 and #3 data inversions provide almost the same readings starting from the layers of h=3 ft and h=5 ft, respectively. These results show that application of the 1D+1D method using the joint inversion of all subarrays and one formation model may lead to recovery of the incorrect 2-D formation model.

Figure 6A:
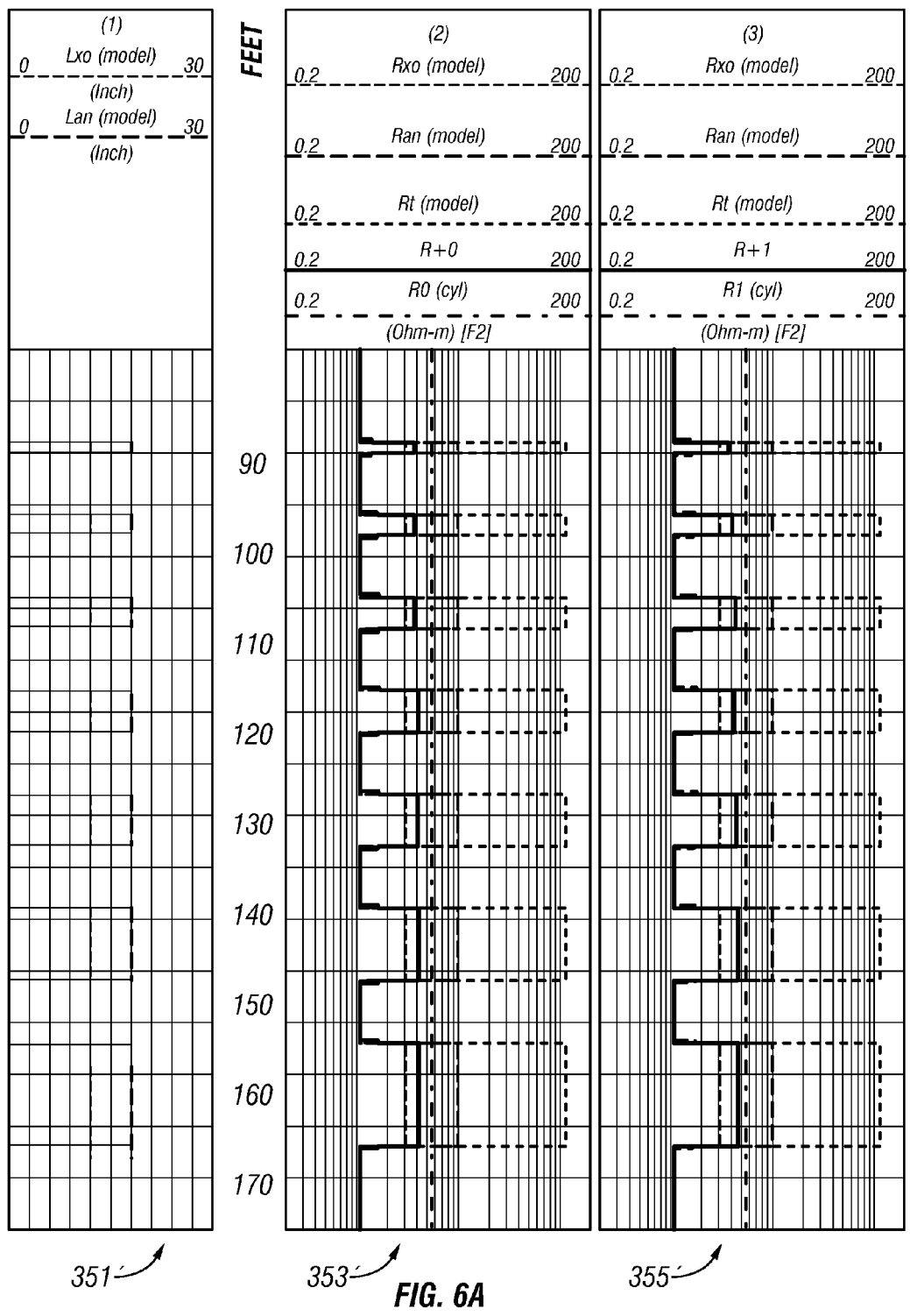
FIGS. 6a, 6b, 6c show results of 1-D vertical inversion of synthetic data using transition auxiliary layers.
Figure 6B:
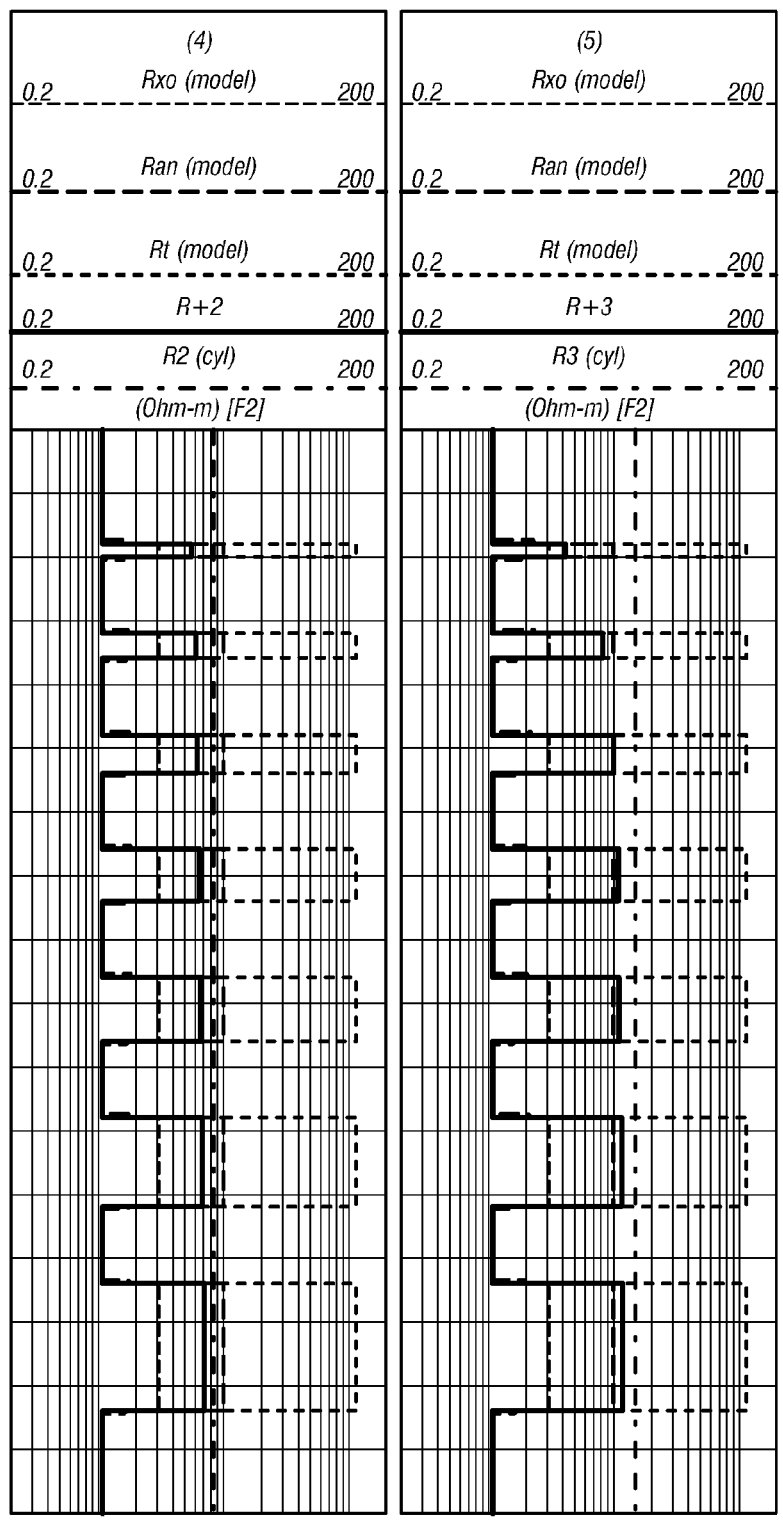
Figure 6C:
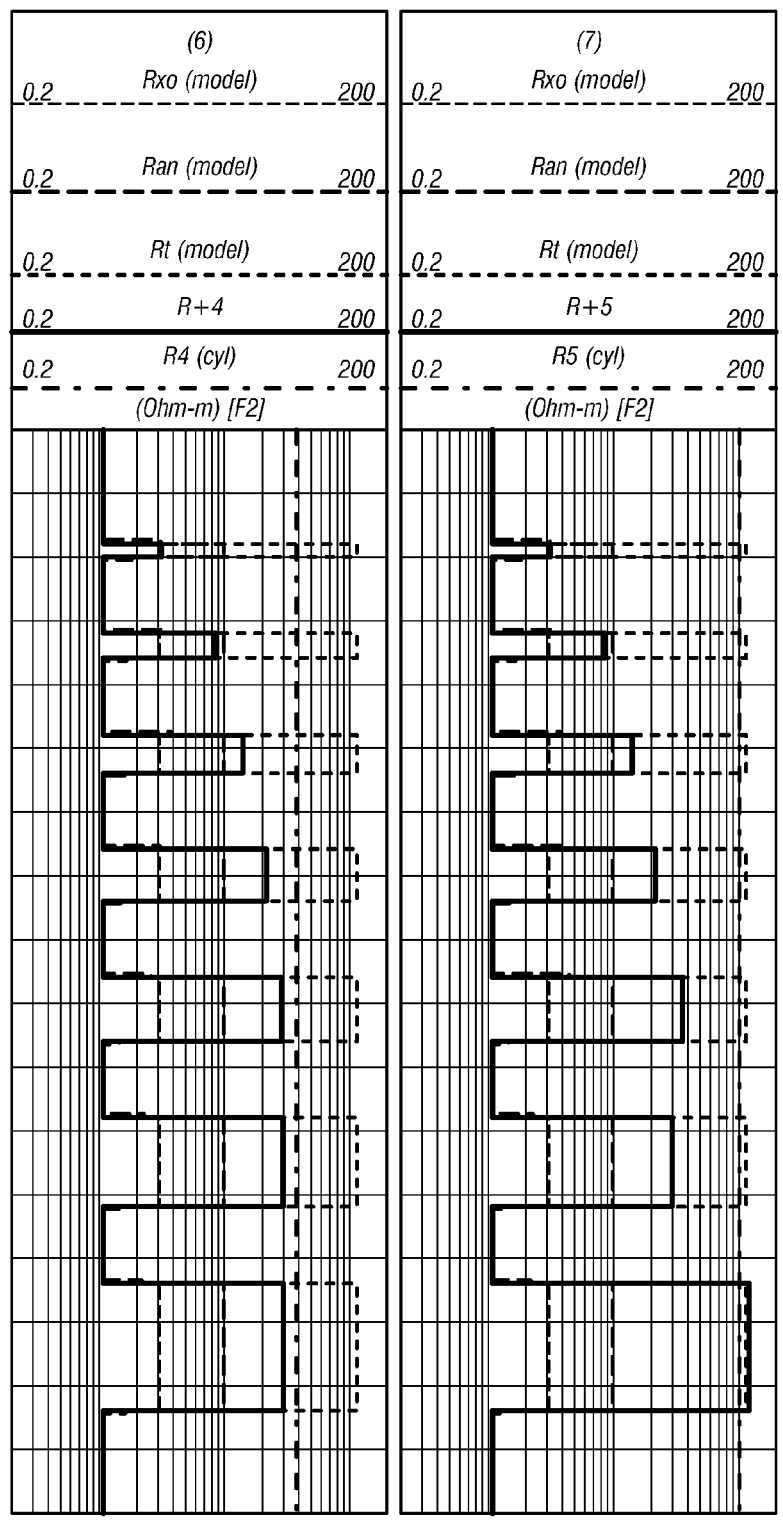

FIGS. 6a–6c show the effect of the transition zones between the layers on the inversion results. The modeling shows reduction of the shoulder bed effect on the inversion results. Therefore, introduction of the transition zones between the layers not only stabilizes the inversion process but also reduces the environmental effects. 351' shows the invasion model. The dashed lines in tracks 353'–363' are the resistivities for the model. The tracks 353'–363' also show inversion results for the individual subarrays #0–5. Results for two different inversion methods are shown: one corresponds to a 2-D inversion whereas the other corresponds to a 1-D cylindrical model (straight line).

The second concept used in the present invention is based on the recognition that the different subarrays have different resolution and different depths of investigation of the earth formation. Accordingly, when a joint inversion is carried out, the high resolution information present in the shorter subarrays is smeared by the poorer resolution of the longer subarrays. Similarly, the longer subarrays see deeper into the formation than do the shorter subarrays and hence should be more important for the deeper part of the model than the shorter subarrays.

Figure 7A:
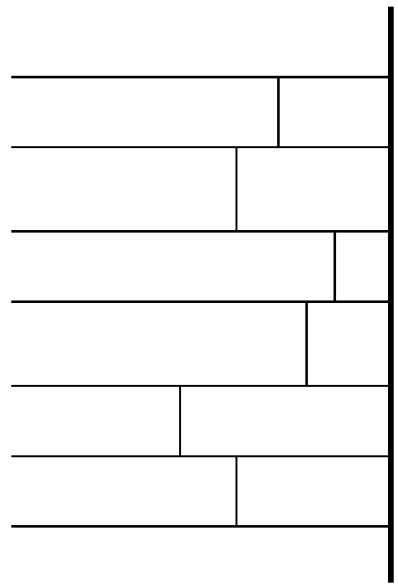
FIGS. 7a and 7b show examples of Multiscale Formation Models with different vertical resolution (the borehole can be vertical or deviated, or horizontal)
Figure 7A:
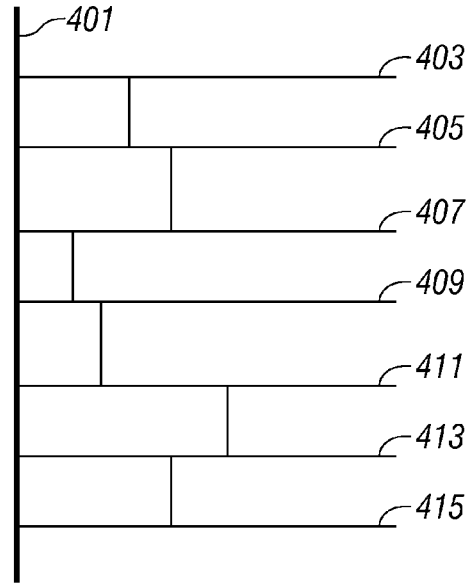
Figure 7B:
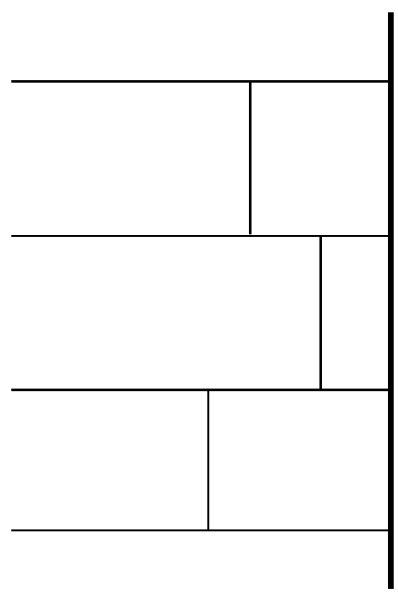
Figure 7B:
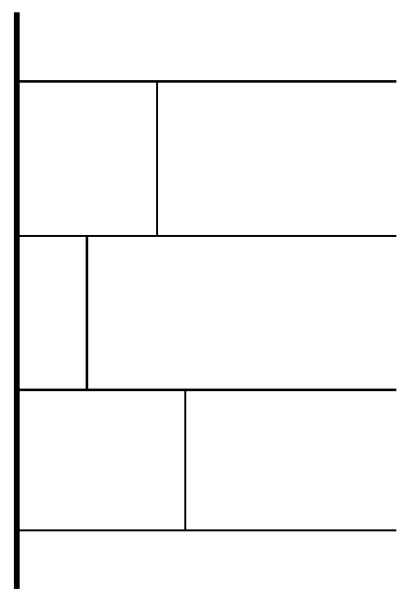

The resolution concept is shown schematically in FIG. 7a depicting a model that may be obtained from short subarray logs and used for their inversion. Shown is a wellbore 401 and layer boundaries 403, 405, 407, 409, 411, 413 and 415. The wellbore 401 can be vertical or deviated or horizontal. Also shown in FIG. 7a are the invaded zones for each of the layers. Compare with FIG. 7b where a model that may be obtained from longer subarrays is shown. For exemplary purposes, only two models are shown in FIGS. 7a and 7b. In reality, there could be more models, up to and including the number of subarrays in the data acquisition. This is a particular example of Multiscale Formation Models (MFM) with the emphasis on vertical resolution.

Figure 8A:
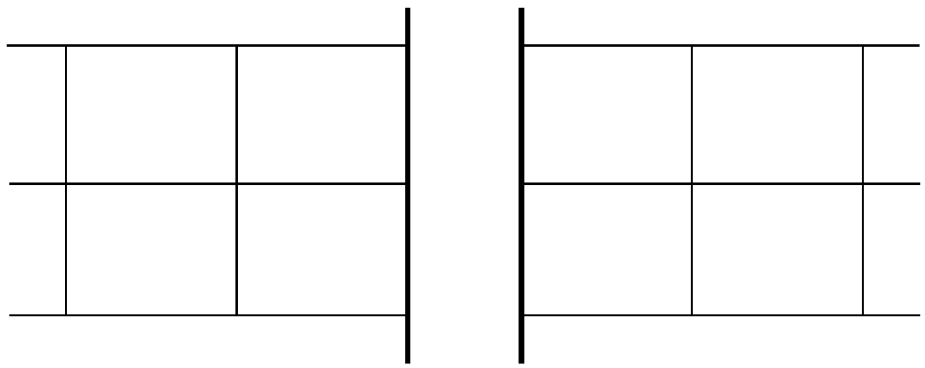
FIGS. 8a –8c show examples of Multiscale Formation Models with different cell sizes.
Figure 8B:
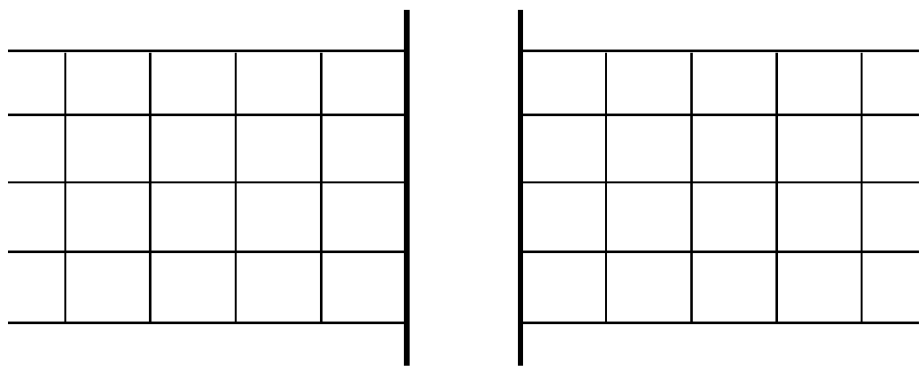
Figure 8C:
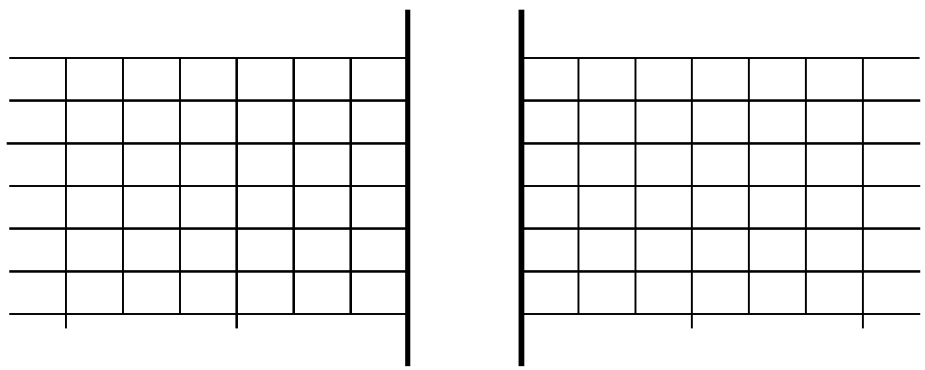

The combination of both vertical resolution and depth of investigation aspect is illustrated by the examples in FIG. 8a–8c. Shown in FIG. 8a is a model with large cell sizes for a 2-D or 3-D inversion. The cell size for the model in FIG. 8b is smaller while the cell size for the model of FIG. 8c is smaller still. Each of the models is suitable for a 2-D or a 3-D inversion of data from a different subarray.

Figure 9A:
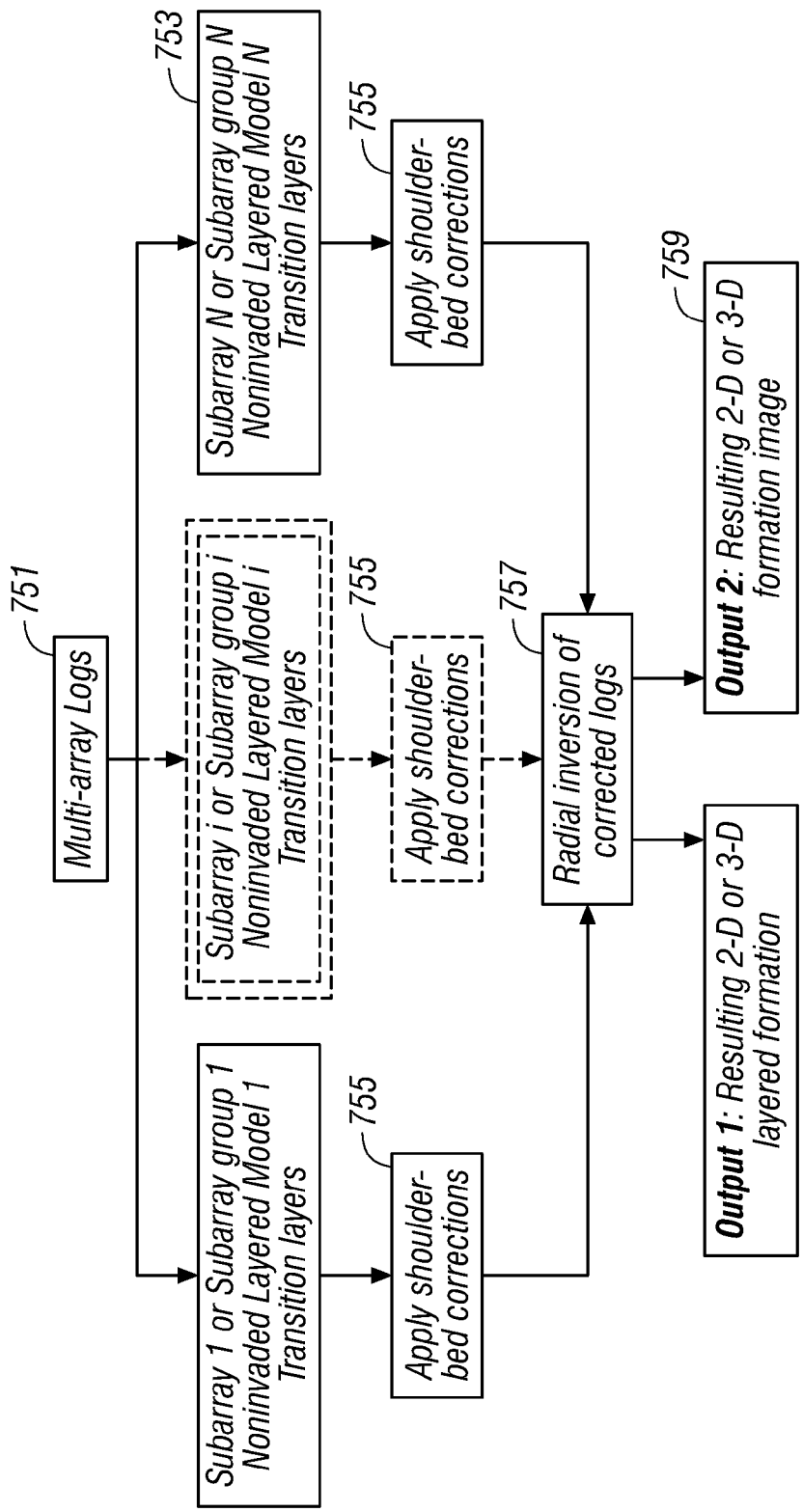
FIG. 9a shows a flow chart of an embodiment of the invention in which different subarrays or group of subarrays with a comparable vertical resolution are corrected separately using separately using different models and the output results in forms of 2D or 3D layered formation or 2D or 3D formation image are produced via radial inversion of the corrected logs.

With these concepts in mind, several sequence of operations are possible in the present invention. Referring now to FIG. 9a, multi array logs are obtained 751. This may be done using, for example, the HDIL tool described by Beard. Processing is carried out for each sub array 1, i, N, 753. The figure uses the term "noninvaded layer", but the method is also applicable for the case where there is a radial velocity variation such as from invasion. It is to be understood that instead of processing each subarray separately, groups of subarrays having a common model may be processed separately 753. A shoulder-bed correction may be optionally applied to each subarray (or group of subarrays) 755. The application of the shoulder bed correction gives a processed log associated with each subarray or group of subarrays. A radial inversion 757 is run to determine a resulting 2-D or 3-D layered formation or resulting 2-D or 3-D continuous formation image 759. This radial inversion may be referred to as additional processing of the processed logs from 755 In one embodiment of the invention, the finest layer structure is selected a radial inversion is run in the center of each layer using a piecewise-constant radial resistivity profile. This enables determination of the parameters of invasion (Lxo, Rxo), annulus (Lan, Ran), and uncontaminated zones (Rt). The radial inversion can also be carried out at each row of cells to determine piecewise-constant formation image. Finally, the radial inversion can be carried out at logging point to determine a continuous radial and vertical earth formation image. The use of the terms "invasion," "annulus" and "uncontaminated zone" is for exemplary purposes only as these zones are commonly present in and around a borehole. The invention is able to determine resistivities as a function of distance from the borehole regardless of what the zones are called.

Figure 9B:
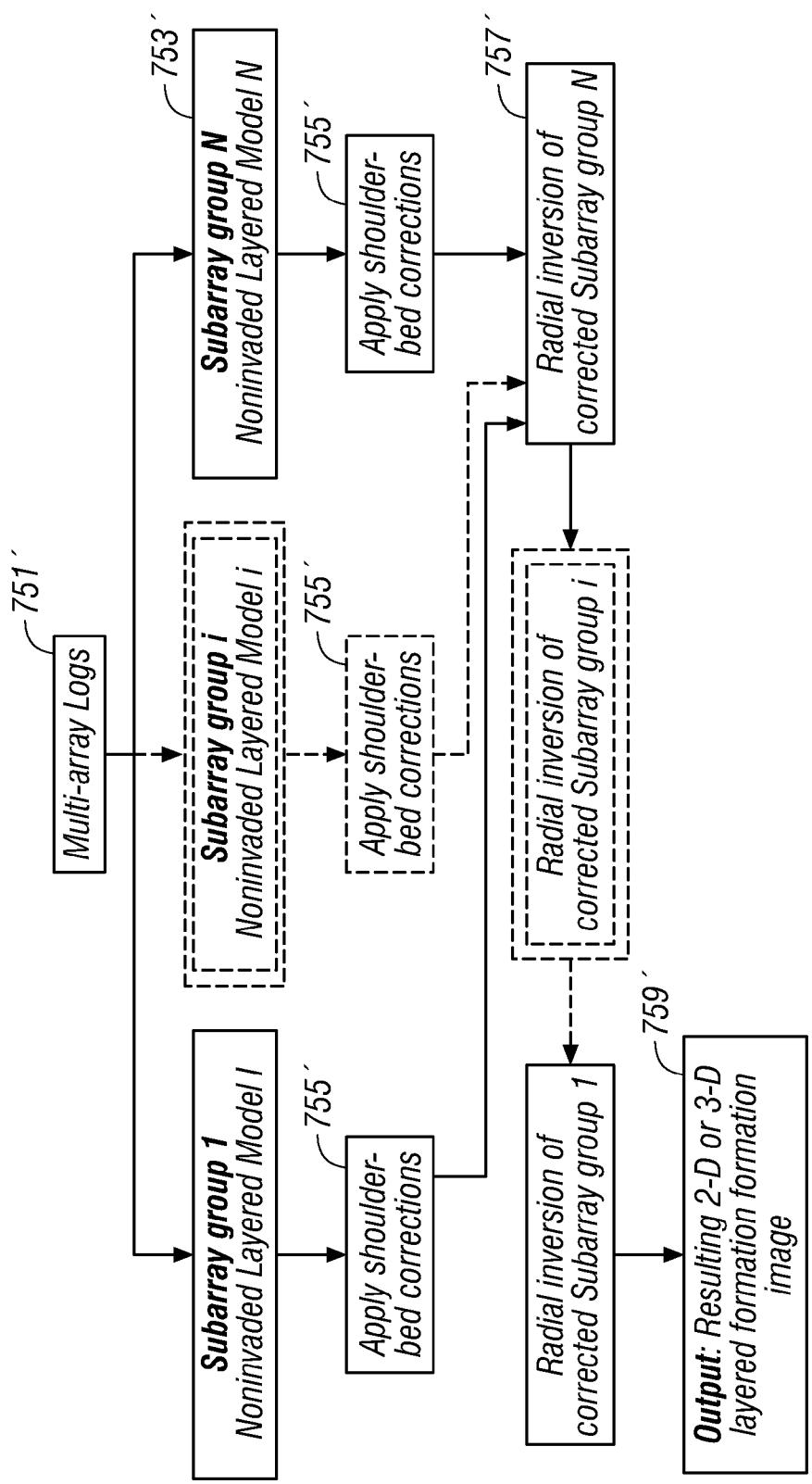
FIG. 9b shows a flow chart of an embodiment of the invention in which different group of subarrays with a comparable vertical resolution are corrected separately using different models and the output results in forms of 2D or 3D layered formations are produced via a sequence of radial inversions of the corrected logs allowing gradually refine the resulting formation model.

Another flow chart that may be used is shown in FIG. 9b. Processing is carried out separately for groups of subarrays having a common model may be processed 1, i, N, 753'. The figure uses the term "noninvaded layer" but the method is also applicable when there is a radial velocity variation such as from invasion. A shoulder-bed correction is applied to each subarray (or group of subarrays) 755'. This gives a processed log corresponding to each subarray or group of subarrays. A radial inversion 757' is run sequentially starting from the longest group of subarrays. Execution of inversion at the following step starts from the inversion results of the previous step. This process leads to a gradual, fast, and stable model refining and provides a resulting 2-D or 3-D layered formation structure or cell-based formation structure (image) of the highest vertical resolution. The sequential radial inversion is different from the joint radial inversion 757 of FIG. 9a but may still be considered as additional processing of the processed log corresponding to each subarray or group of subarrays.

It should be noted that the inversion and imaging algorithms described above and shown in FIGS. 9a and 9b can use Multiscale Formation Models (MFM) depicted in both FIGS. 7 and 8.

Figure 10:
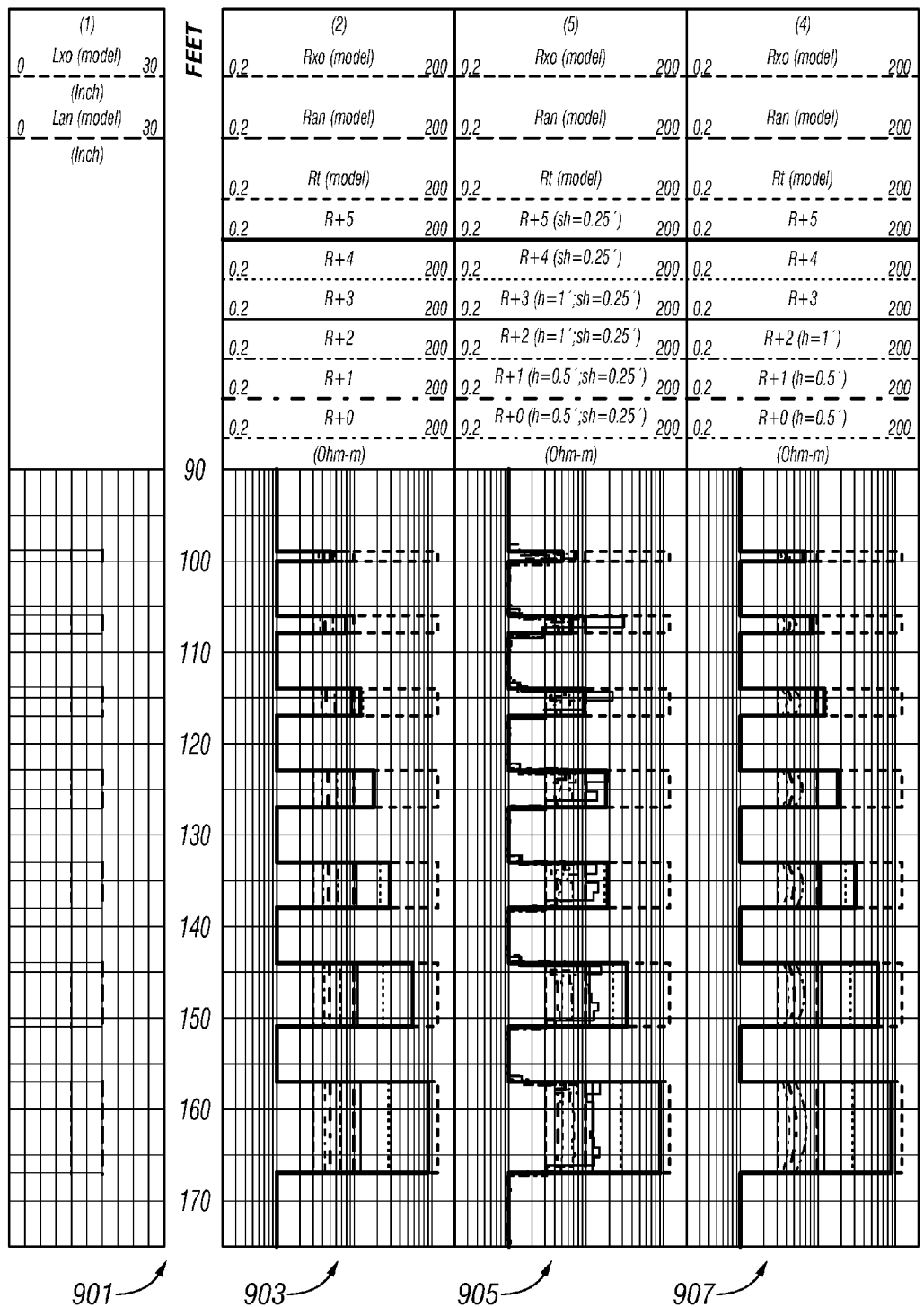
FIG. 10 is an example showing improvements resulting from the use of transition zones.

Based on the results shown above, in one embodiment of the invention, subarrays #0–1 are used for the radial inversion step in each layer, including the thinnest 1-ft one. The subarrays #s 2, 3, 4, and 5 logs can, for example, be used in the inversion process in the layers of 2 ft, 3 ft, 7 ft, and >7 ft, respectively.

turning now to FIG. 10, exemplary results are described Tracks 901 and 903 are the same as 201 and 203 of FIG. 2 (i.e., they show the resistivity model and results of a 1-D inversion for the different subarrays). Track 905 shows the results of a multiscale model inversion in which the layer boundaries are displaced from their true position by one sample (0.25 ft), layers of constant thickness, and no transition zones are used between the layers. The results are quite erratic and unstable for the different subarrays. In contrast, 907 shows the results using the method described above with transition zones. The results do not exhibit the instability and accurately estimate the true formation resistivities.

Another embodiment of the invention is illustrated in FIG. 11 and discussed with reference to FIGS. 8a–8c. This embodiment is particularly useful in imaging applications. Data from a large-scale array are inverted 1001 to a sparse grid such as that in FIG. 8a. The results of this inversion are then used as an initial estimate for inversion 1003 of data from a different array at a less sparse grid such as that in FIG. 8b. This is repeated 1005, 1007 to give a final inverted model at 1007 at a fine scale such as that in FIG. 8c. Each of the inversions (1003, 1005 . . . 1007) may be an inversion of the additional data being analyzed or it may be a joint inversion including data analyzed in earlier steps. This is an example of multiscale inversion starting going from a coarser to a finer scale.

Another embodiment of the invention goes in the opposite direction, i.e., from a fine scale to a large scale. This is illustrated in FIG. 12. The process may start at 1021 using a fine layered model such as may be obtained by a microresistivity tool in a borehole. These data define the initial model for inverting 1023 a first subarray group data 1031 for the fine layered model. Transition layers may be added at this point 1025 or may be added later in the processing. Inversion is then carried out using data from a second subarray group having a coarser scale 1033 to give a model with thicker layers 1027. This process may be repeated, processing additional subarray groups of data to give an inverted final model 1029

The common thread between the different embodiments of the invention discussed above is that they all determine a resistivity property of an earth formation. Multiarray data from a plurality of transmitter-receiver spacings is obtained. A plurality of resistivity models is defined. Each of the resistivity models corresponds to a subset of the multiarray data. Each subset of the data is processed using its associated model to give a plurality of partially processed data sets. From the partially processed data sets, the property of the earth formation is determined.

The processing of the measurements made by the probe in wireline applications may be done by the surface processor 64 or may be done by a downhole processor (not shown). For MWD applications, the processing may be done by a downhole processor that is part of the BHA. This downhole processing reduces the amount of data that has to be telemetered. Alternatively, some or part of the data may be telemetered to the surface.

The operation of the transmitter and receivers may be controlled by the downhole processor and/or the surface processor. Implicit in the control and processing of the data is the use of a computer program implemented on a suitable machine readable medium that enables the processor to perform the control and processing. The machine readable medium may include ROMs, EPROMs, EAROMs, Flash Memories and Optical disks.

The present invention has been discussed above with respect to measurements made by multi array induction logging tool conveyed on a wireline. This is not intended to be a limitation and the method is equally applicable to 3 DEX measurements made using a multicomponent logging tool, and to measurements made with a tool on a measurement-while-drilling (MWD) assembly conveyed on a drill string or on coiled tubing. The method is also applicable to processing of data obtained by galvanic sensors. It should further be noted that for the purposes of the present invention, determination of a resistivity is the same as the determination of a conductivity.

While the foregoing disclosure is directed to the preferred embodiments of the invention, various modifications will be apparent to those skilled in the art. It is intended that all variations within the scope and spirit of the appended claims be embraced by the foregoing disclosure.

What is claimed is:

1. A method of determining a property of an earth formation, the method comprising:
   (a) obtaining a plurality of subsets of array data indicative of the property using a logging tool conveyed in a borehole in the earth formation, each of the plurality of subsets of array data having an associated resolution;
   (b) processing a first subset of array data to give a first model of the earth formation; and
   (c) obtaining and storing on a suitable storage medium at least one of (A) a 2-D layered model of the formation representative of a structure of the formation, (B) a 3-D layered model of the formation representative of a structure of the formation, and (C) 2-D image of the formation from the first model and from processing at least one of the subsets other than the first subset of array data.

2. The method of claim 1 wherein the processing in (c) further comprises separately processing each of a plurality of subsets of the array data.

3. The method of claim 1 wherein the property comprises a resistivity of the the earth formation.

4. The method of claim 3 further comprising acquiring the array data using at least one of (i) a multiarray induction logging tool, (ii) a multicomponent induction logging tool, and (iii) a galvanic logging tool.

5. The method of claim 1 wherein each of the plurality of subsets is selected from the group consisting of (i) a subarray of the array data, and (ii) a group of subarrays of the array data.

6. The method of claim 2 further comprising a separate processing of the other subsets, the separate processing including at least one of (i) using a transition layer in a model, (ii) using a non-invaded model, and (iii) applying a shoulder bed correction.

7. The method of claim 1 further comprising a radial inversion.

8. The method of claim 7 wherein the radial inversion further comprises one of (i) a joint inversion, and (ii) a sequential inversion.

9. The method of claim 1 wherein at least one of the subsets has a different vertical resolution than another of the subsets.

10. The method of claim 1 wherein at least one of the subsets has a different horizontal resolution than another of the subsets.

11. a The method of claim 1 further comprising a separate processing of the other subsets, the other processing including an inversion that includes at least one of (i) a 1-D inversion, and (ii) a constrained inversion.

12. The method of claim 1 further comprising a separate processing of the other subsets, the separate processing including an inversion in which transition layers are defined above and below an initially estimated bed boundary.

13. The method of claim 1 wherein the first model is used as an initial model for(c).

14. The method of claim 13 wherein the processing in (c) further comprises at least one of (i) a separate inversion, and (ii) a joint inversion.

15. The method of claim 13 wherein the first subset has an associated resolution less than any of the other subsets.

16. The method of claim 13 wherein the first subset has an associated resolution greater than any of the other subsets.

17. An apparatus for determining a property of an earth formation comprising:
   (a) a logging tool configured to be conveyed in a borehole in the earth formation, the logging tool configured to obtain a plurality of subsets of array data indicative of the property, each of the plurality of subsets having an associated resolution;
   (b) a processor configured to:
   (A) process a first subset of the array data to give a first model; and
   (B) obtain and store on a suitable storage medium at least one of (I) a 2-D layered model of the formation representative of a structure of the formation, (II) a 3-D-layered model of the formation representative of a structure of the formation, and (III) a 2-D image of the formation from the first model by processing at least one of the subsets other than the first subset of the array data.

18. The apparatus of claim 17 wherein the processing in (c) further comprises a separate processing of each of a plurality of subsets of the array data.

19. The apparatus of claim 17 wherein the property comprises a resistivity of of the earth formation.

20. The apparatus of claim 19 wherein the logging tool comprises at least one of (i) a multiarray induction logging tool, (ii) a multicomponent induction logging tool, and (iii) a galvanic logging tool.

21. The apparatus of claim 17 wherein the processor is further configured to select each of the plurality of subsets from the group consisting of (i) a subarray of the array data, and (ii) a group of subarrays of the array data.

22. The apparatus of claim 17 wherein the processing in (b) further comprises a separate processing by at least one of (i) using a transition layer in a model, (ii) using a non-invaded model, and (iii) applying a shoulder bed correction.

23. The apparatus of claim 17 wherein the processing in (b) further comprises an additional processing including a radial inversion.

24. The apparatus of claim 17 wherein at least one of the subsets has a different vertical resolution than another of the subsets.

25. The apparatus of claim 17 wherein at least one of the subsets has a different horizontal resolution than another of the subsets.

26. The apparatus of claim 17 wherein the processing in (b) further comprises a separate processing using at least one of (i) a 1-D inversion, and (ii) a constrained inversion.

27. The apparatus of claim 17 further comprising a conveyance device configured to convey the logging tool into the borehole, the conveyance device selected from (i) a wireline, (ii) a drilling tubular, and (iii) a slickline.

28. The apparatus of claim 17 wherein the processor uses the first model as an initial model for (b).

29. The apparatus of claim 28 wherein the processing in (b) further comprises at least one of (i) a separate inversion, and (ii) a joint inversion.

30. A computer readable medium for use with an apparatus for determining a property of an earth formation, the apparatus comprising:
(a) a logging tool conveyed in a borehole in the earth formation configured to obtain a plurality of subsets of array data indicative of the
property, each of the subsets having an associated resolution;
the medium comprising instructions which enable a processor to:
(b) process a first subset of the array data to give a first model; and
(c) obtain and store on a suitable storage medium at least one of I) a 2-D layered model of the formation representative of a structure of the formation ,(II) a 3-D -layered model of the formation representative of a structure of the formation, and (III) a 2-D image of the formation from the first model by processing at least one of the subsets other than the first subset of the array data.

31. The medium of claim 30 further comprising at least one of (i) a ROM, (ii) an EPROM, (iii) an EAROM, (iv) a Flash Memory, and (v) an optical disk.

* * * * *